(12) United States Patent
Funke et al.

(10) Patent No.: US 8,189,034 B2
(45) Date of Patent: May 29, 2012

(54) COMBINED EXCHANGE OF IMAGE AND RELATED DEPTH DATA

(75) Inventors: Eric Peter Funke, Eindhoven (NL); Henricus Elbertus Wilhelmina Beekers, Brugge (BE); Ralph Braspenning, Eindhoven (NL); Reinout Verburgh, Brugge (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1191 days.

(21) Appl. No.: 11/917,958

(22) PCT Filed: Jun. 20, 2006

(86) PCT No.: PCT/IB2006/051972
§ 371 (c)(1),
(2), (4) Date: Dec. 18, 2007

(87) PCT Pub. No.: WO2006/137006
PCT Pub. Date: Dec. 28, 2006

(65) Prior Publication Data
US 2010/0214393 A1    Aug. 26, 2010

(30) Foreign Application Priority Data
Jun. 23, 2005   (EP) .................................. 05105621

(51) Int. Cl.
*H04N 13/00*    (2006.01)
(52) U.S. Cl. .......................................... 348/43; 348/42
(58) Field of Classification Search .................... 348/42, 348/43, 46
See application file for complete search history.

(56) References Cited

U.S. PATENT DOCUMENTS

| | | | |
|---|---|---|---|
| 4,704,629 A | 11/1987 | Vreeswijk et al. | |
| 5,193,000 A | 3/1993 | Lipton | |
| 5,280,337 A * | 1/1994 | DesJardins | 348/659 |
| 5,886,701 A * | 3/1999 | Chauvin et al. | 345/418 |
| 6,292,194 B1 * | 9/2001 | Powell, III | 345/582 |
| 6,369,855 B1 * | 4/2002 | Chauvel et al. | 348/423.1 |
| 6,650,773 B1 * | 11/2003 | Maurer et al. | 382/166 |
| 7,412,001 B2 * | 8/2008 | Dufour et al. | 375/240.08 |
| 2003/0146883 A1 * | 8/2003 | Zelitt | 345/6 |

FOREIGN PATENT DOCUMENTS

| | | |
|---|---|---|
| DE | 19619598 A1 | 11/1997 |
| WO | WO9743863 A1 | 11/1997 |

OTHER PUBLICATIONS

A. Robert et al., Synthesis of Multi Viewpoint Images at Non-Intermediate position, Acoustics, Speech, and Signal Processing, 1997, ICASSP-97, IEEE Int'l Conf. on Munich, Germany, Apr. 1997, Los Alamitos, CA, IEEE Comput. Soc., US, vol. 4, pp. 2749-2752, XP010225725.

(Continued)

*Primary Examiner* — Faruk Hamza

(57) ABSTRACT

A method of combined exchange of image data and related depth data is disclosed. The method comprises: converting an input image signal, representing the image data, comprising a predetermined number of input color components (R,G,B) into an output image signal comprising a luminance component and a chrominance component; combining the output signal with the related depth data into a combined signal, comprising the luminance component, the chrominance component and a depth component (D) which is based on the depth data; and transmission of the combined signal over a number of channels (108-112) which is equal to the predetermined number of input color components (R,G,B).

8 Claims, 4 Drawing Sheets

OTHER PUBLICATIONS

Figure 1:
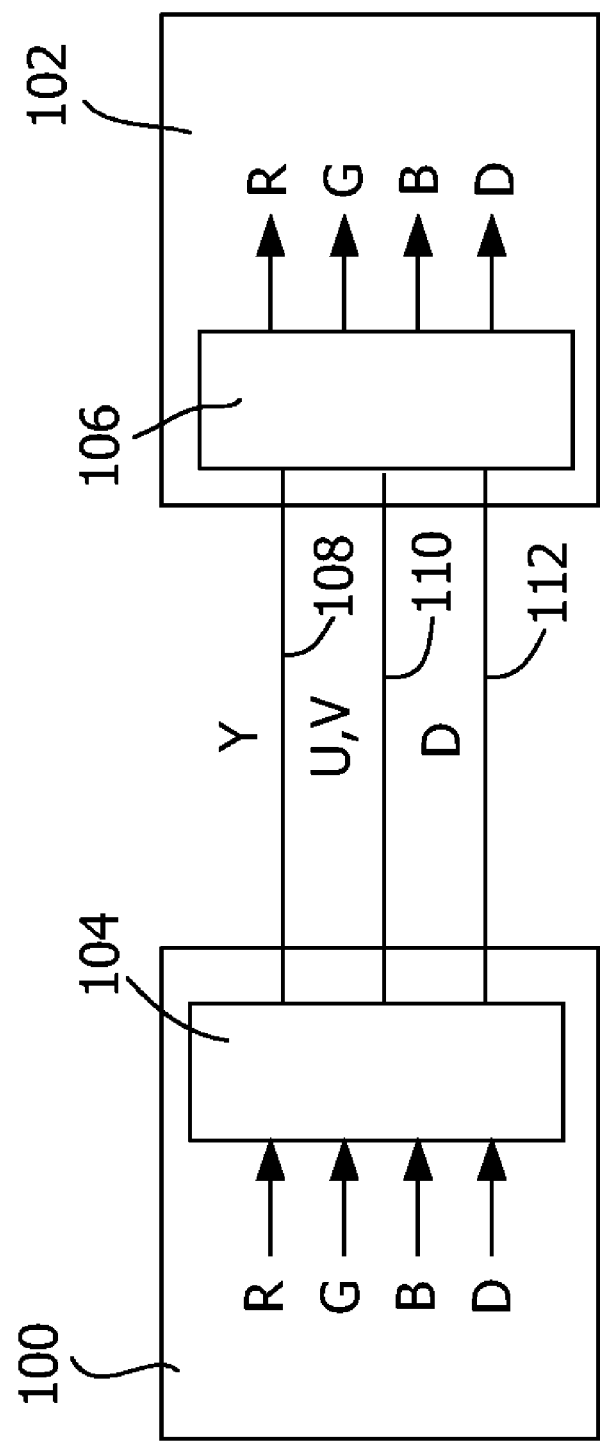

"Proposed Standard for Field-Sequential 3D Video—A method for the Recording and Playback of Stereoscopic 3D Images and video Sequences with the NTSC, PAL, and SECAM Video Standards", Jan. 2001, SD&A/SPIE http://www.stereoscopic.org/standard/fs3dstd04.pdf.

A. Sullivan et al., Solid State Multi-Planar Volumetric Display, Proceeding sof SID '03, pp. 1531-1533, 2003.

D.F. McAllsiter et al., Stereo Computer Graphics and Other True 3D Technologies, Princeton University Press, 1993.

* cited by examiner

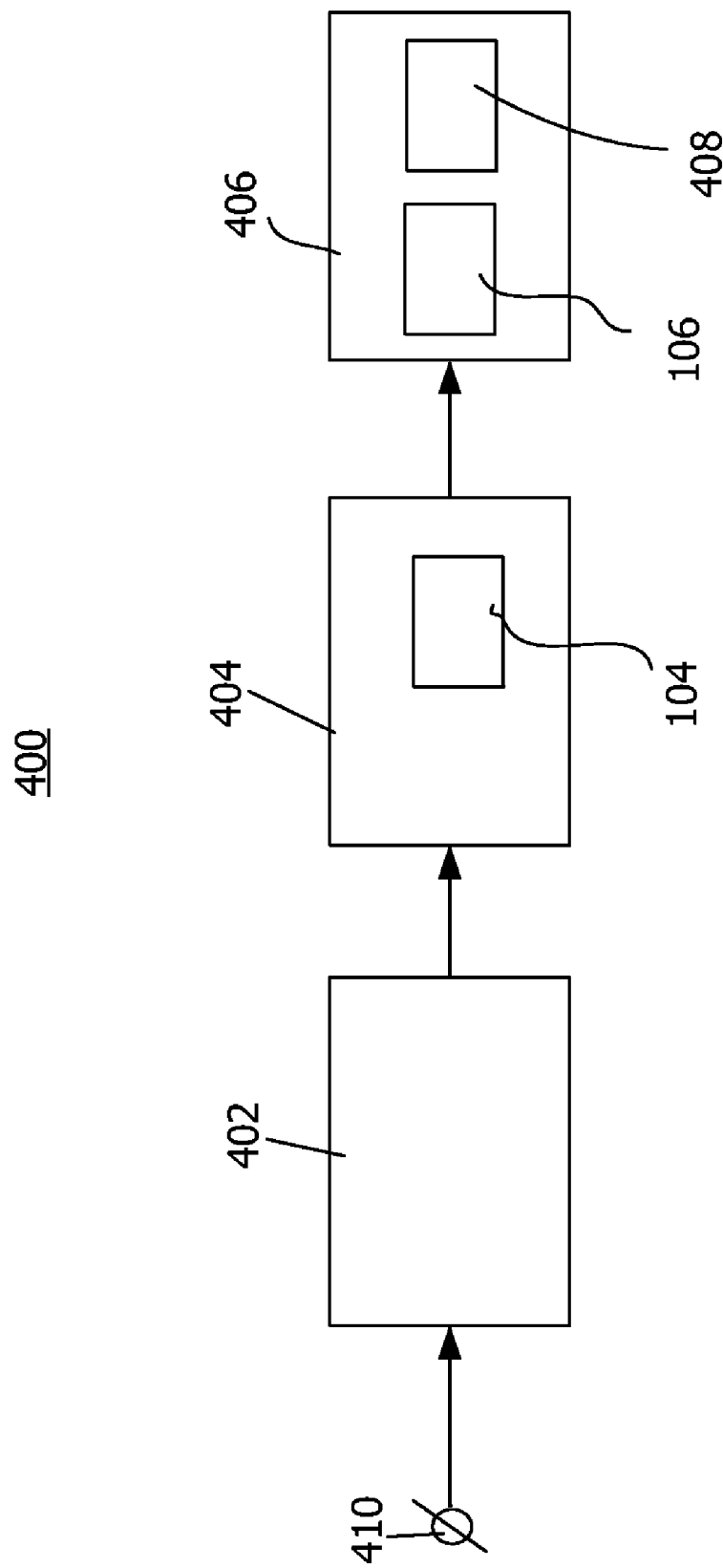

COMBINED EXCHANGE OF IMAGE AND RELATED DEPTH DATA

The invention relates to methods of combined exchange of image data and related depth data.

The invention further relates to a transmitting unit for combined exchange of image data and related depth data.

The invention further relates to an image processing apparatus comprising such a transmitting unit.

The invention further relates to a receiving unit for combined exchange of image data and related depth data.

The invention further relates to a multi-view display device comprising such a receiving unit.

Since the introduction of display devices, a realistic 3-D display device has been a dream for many. Many principles that should lead to such a display device have been investigated. Some principles try to create a realistic 3-D object in a certain volume. For instance, in the display device as disclosed in the article "Solid-state Multi-planar Volumetric Display", by A. Sullivan in proceedings of SID '03, 1531-1533, 2003, visual data is displaced at an array of planes by means of a fast projector. Each plane is a switchable diffuser. If the number of planes is sufficiently high the human brain integrates the picture and observes a realistic 3-D object. This principle allows a viewer to look around the object within some extent. In this display device all objects are (semi-) transparent.

Many others try to create a 3-D display device based on binocular disparity only. In these systems the left and right eye of the viewer perceives another image and consequently, the viewer perceives a 3-D image. An overview of these concepts can be found in the book "Stereo Computer Graphics and Other True 3-D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3-D without the need for additional appliances are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different images in his left and right eye if he is positioned at the correct spot, and is able to perceive a 3-D picture.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See for instance U.S. Pat. No. 5,986,804 where a barrier plate is combined with a red and green led. In case the viewer is well positioned he sees a green light, and a red light otherwise.

To relieve the viewer of sitting at a fixed position, multi-view auto-stereoscopic display devices have been proposed. See for instance United States patents U.S. 60/064,424 and US20000912. In the display devices as disclosed in U.S. 60/064,424 and US20000912 a slanted lenticular is used, whereby the width of the lenticular is larger than two sub-pixels. In this way there are several images next to each other and the viewer has some freedom to move to the left and right.

In order to generate a 3-D impression on a multi-view display device, images from different virtual viewpoints have to be rendered. This requires either multiple input views or some 3-D or depth information to be present. This depth information can be recorded, generated from multi-view camera systems or generated from conventional 2-D video material. For generating depth information from 2-D video several types of depth cues can be applied: such as structure from motion, focus information, geometric shapes and dynamic occlusion. The aim is to generate a dense depth map, i.e. per pixel a depth value. This depth map is subsequently used in rendering a multi-view image to give the viewer a depth impression. In the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed. The multi-view image is a set of images, to be displayed by a multi-view display device to create a 3-D impression. Typically, the images of the set are created on basis of an input image. Creating one of these images is done by shifting the pixels of the input image with respective amounts of shift. These amounts of shifts are called disparities. So, typically for each pixel there is a corresponding disparity value, together forming a disparity map. Disparity values and depth values are typically inversely related, i.e.:

$$S = \frac{\alpha}{D} \quad (1)$$

with S being disparity, $\alpha$ a constant value and D being depth. Creating a depth map is considered to be equivalent with creating a disparity map. In this specification disparity values and depth values are both covered by the term depth related data elements.

The video data, i.e. the image signal and the corresponding depth data have to be exchanged between various image processing units and eventually to a display device, in particular a multi-view display device. Typically video data is exchanged by means of an RGB link. That means that three correlated but separated streams of data are transferred by means of three channels. Examples of standards which are based on such a RGB link are DVI (digital visual interface) and LVDS (low-voltage differential signaling). However in the case of 3-D, along with the video data, the depth related data has to be exchanged too.

It is an object of the invention to provide a method of the kind described in the opening paragraph which is adapted to existing video interfaces.

This object of the invention is achieved in that the method comprises:

converting an input image signal, representing the image data, comprising a predetermined number of input color components into an output image signal comprising a luminance component and a chrominance component;

combining the output signal with the related depth data into a combined signal, comprising the luminance component, the chrominance component and a depth component which is based on the depth data; and transmission of the combined signal over a number of channels which is equal to the predetermined number of input color components.

By converting the input image signal comprising a predetermined number of input color components into an output image signal having at least one component less than the input image signal has, room is created for the exchange of the depth data.

Typically, the input color components comprise a red component (R) a green component (G) and a blue component (B).

Preferably, the luminance component is transmitted over a first one of the channels, the chrominance component is transmitted over a second one of the channels and the depth component is transmitted over a third one of the channels.

Each of the channels has a bandwidth, i.e. maximum amount of information which can be exchanged per time unit. Preferably the combined exchange of image and related depth data is such that the applied bandwidth for the number of channels is substantially mutually equal. That means that per unit of time substantially the same amount of information is exchanged over the respective channels. To achieve that it is preferred that the chrominance component comprises a further number of output color components which are computed on basis of spatially subsampling the input image signal and that the further number of output components are transmitted over the second one of the channels by means of multiplexing.

Exchange of information comprises sending and receiving. The method as described and discussed above is related to the sending part of the exchange of data. It is another object of the invention to provide a corresponding method which is related to the receiving part of the exchange of data and which is also adapted to existing video interfaces.

This object of the invention is achieved in that the corresponding method comprises:

reception of a combined signal, comprising a luminance component and a chrominance component representing the image data and comprising a depth component which is based on the depth data, the combined signal being transmitted over a number of channels;

extracting the luminance component and the chrominance component from the combined signal; and converting the luminance component and the chrominance component into an image signal, representing the image data, the image signal comprising a predetermined number of input color components whereby the predetermined number of input color components is equal to the number of channels.

It is a further object of the invention to provide a transmitting unit of the kind described in the opening paragraph which is adapted to existing video interfaces.

This object of the invention is achieved in that the transmitting unit comprises:

converting means for converting an input image signal, representing the image data, comprising a predetermined number of input color components into an output image signal comprising a luminance component and a chrominance component;

combining means for combining the output signal with the related depth data into a combined signal, comprising the luminance component, the chrominance component and a depth component which is based on the depth data; and outputting means for outputting the combined signal over a number of channels which is equal to the predetermined number of input color components.

It is a further object of the invention to provide a receiving unit of the kind described in the opening paragraph which is adapted to existing video interfaces.

This object of the invention is achieved in that the receiving unit comprises:

reception means for reception of a combined signal, comprising a luminance component and a chrominance component representing the image data and comprising a depth component which is based on the depth data, the combined signal being transmitted over a number of channels;

extracting means for extracting the luminance component and the chrominance component from the combined signal;

converting means for converting the luminance component and the chrominance component into an image signal, representing the image data, the image signal comprising a predetermined number of input color components whereby the predetermined number of input color components is equal to the number of channels.

It is a further object of the invention to provide an image processing apparatus of the kind described in the opening paragraph which is adapted to existing video interfaces.

This object of the invention is achieved in that the image processing apparatus comprises the transmitting unit as described above.

It is a further object of the invention to provide a multi-view display device of the kind described in the opening paragraph which is adapted to existing video interfaces.

This object of the invention is achieved in that the multi-view display device comprises the receiving unit as described above.

Modifications of the transmitting unit, the receiving unit, and variations thereof may correspond to modifications and variations thereof of the image processing apparatus, the multi-view display device and the methods being described.

Figure 2:
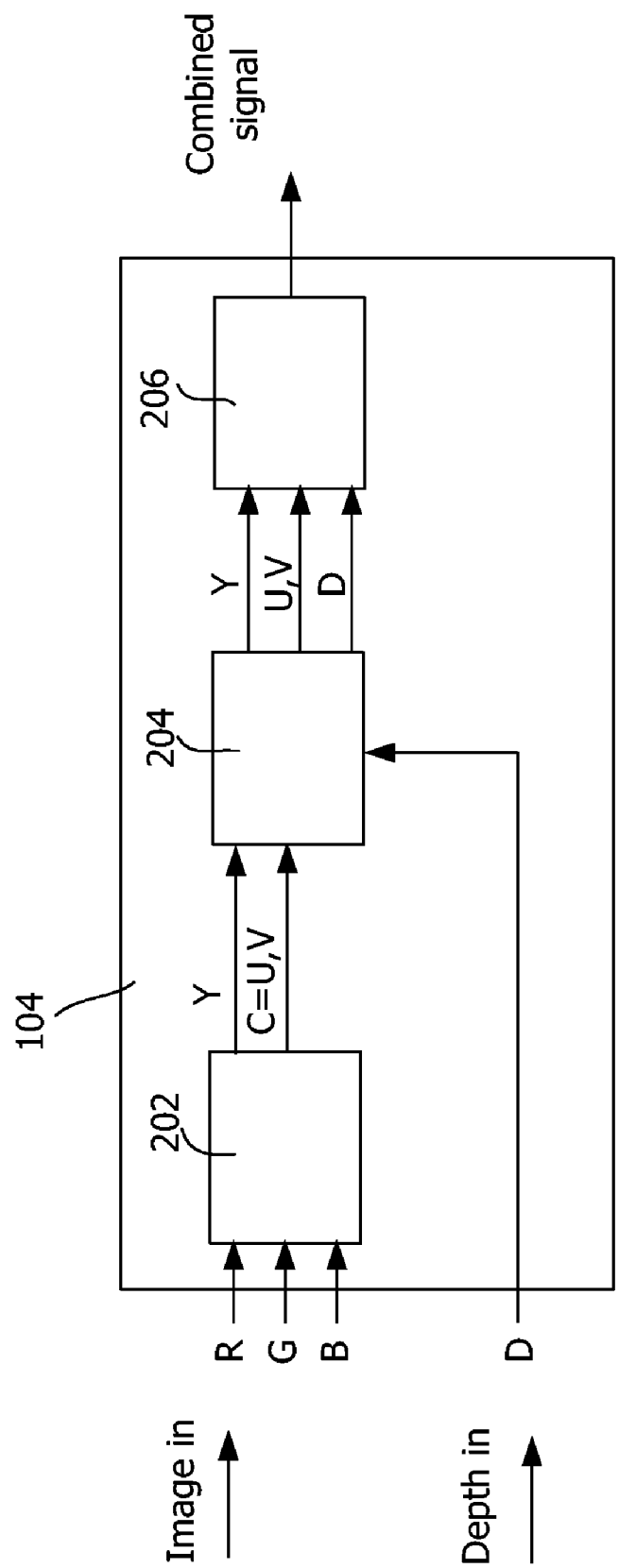
Figure 3:
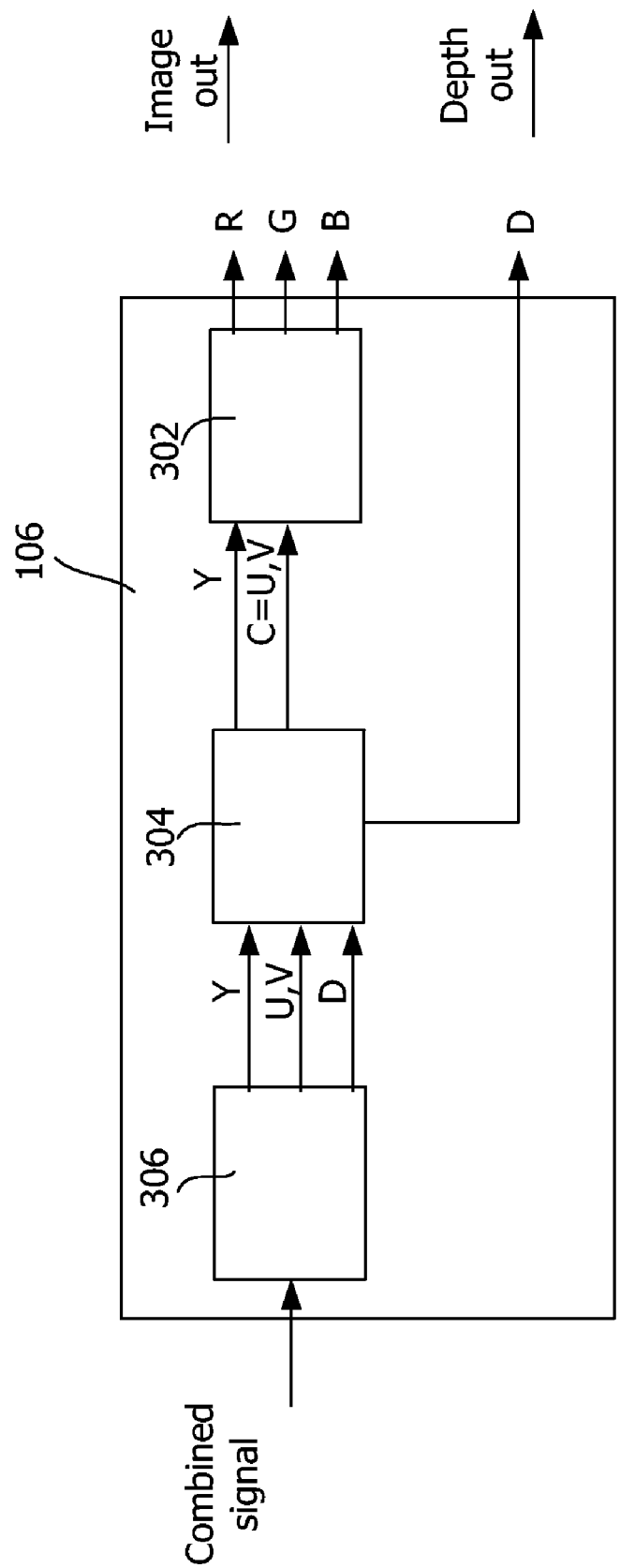

These and other aspects of the transmitting unit, the receiving unit, the image processing apparatus, the multi-view display device and the methods according to the invention will become apparent from and will be elucidated with respect to the implementations and embodiments described hereinafter and with reference to the accompanying drawings, wherein:

FIG. 1 schematically shows a first processing device connected to a second processing device;

FIG. 2 schematically shows an embodiment of the transmitting unit according to the invention;

FIG. 3 schematically shows an embodiment of the receiving unit according to the invention; and FIG. 4 schematically shows an image processing apparatus comprising a multi-view display device, both according to the invention.

Same reference numerals are used to denote similar parts throughout the Figures.

FIG. 1 schematically shows a first processing device 100 connected to a second processing device 102. The first processing device 100 and the second processing device may be integrated circuits (IC) like an image processor and a display driver, respectively. Alternatively, the first processing device 100 is a more complex apparatus like a PC and the second processing device 102 is a multi-view display device, e.g. a monitor. The first 100 and second processing device 102 are connected by means of a physical connection. The physical connection is e.g. based on a twisted-pair or on a twisted-pair plus ground for serial transport of data. It should be noted that parallel transport of data is also possible.

On top of the physical connection three logical connections are realized. Each logical connection corresponds to a channel 108-112 for transport of data between the first processing device 100 and the second processing device 102. Examples of connections are based on standards like DVI or LVDS.

The data format being applied within the context of the first processing device 100 is based on four components. There are three the input color components R,G,B which together represent image data and there is a fourth component D which corresponds to depth related data. Typically, the data is stored in two-dimensional matrices comprising for each pixel $P_i$ an $R_i$ sample, a $G_i$ sample, a $B_i$ sample and a $D_i$ sample.

The data format being applied within the context of the second processing device 102 is equal to the data format being applied within the context of the first processing device 100 and hence is based on the four components too.

As said above, there are only three logical connections between the first 100 and second processing device 102. In order to exchange the image data in combination with the corresponding depth data the first processing device 100 comprises a transmitting unit 104 according to the invention and the second processing device 102 comprises a receiving unit 106 according to the invention. The combination of the transmitting unit 104, the physical connection between the first 100 and second 102 processing device and the receiving unit 106 makes data exchange between the first 100 and second 102 processing device possible. Basically, the exchange is based on a first conversion of the image data into intermediate data, combining the intermediate data with the depth data, transmission, separating the depth data from the intermediate data and a second conversion of the intermediate data into the image data.

FIG. 2 schematically shows an embodiment of the transmitting unit 104 according to the invention. The transmitting unit 104 is arranged to combine image data and related depth data in order to exchange the combined data. The transmitting unit 104 comprises:

a converting unit 202 for converting an input image signal, representing the image data, comprising a predetermined number of input color components R,G,B into an output image signal comprising a luminance component Y and a chrominance component C;

a combining unit 204 for combining the output signal with the related depth data D into a combined signal, comprising the luminance component Y, the chrominance C component and a depth component D which is based on the depth data; and an outputting unit 206 for outputting the combined signal over a number of channels which is equal to the predetermined number of input color components.

The converting unit 202, the combining unit 204 and the outputting unit 206 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

Preferably the chrominance component C comprises two output color components U and V. The converting unit 202 is arranged to compute samples of the luminance component and the two output color components on basis of the three input color components R,G,B, as specified in Equations 2-4

$$Y = R^* 0.299 + G^* 0.587 + B^* 0.114 \quad (2)$$

$$U = R^* -0.147 + G^* -0.289 + B^* 0.437 \quad (3)$$

$$V = R^* 0.615 + G^* -0.515 + B^* -0.1 \quad (4)$$

Preferably, spatial sub-sampling is applied to reduce the number of U and V samples with a factor of two. The result is that the number of $Y_i$ samples is twice the number of $U_i$ samples and twice the number of $V_i$ samples. Before subsampling takes place preferably low pass filtering is applied.

The combining unit 204 is arranged to combine the corresponding samples of the luminance component Y, the first output color component U, the second output color component V and the depth component D to a sequence of triplets of samples, e.g.:

$(Y_1,U_1,D_1),(Y_2,V_1,D_2),(Y_3,U_3,D_3),(Y_4,V_3,D_4),(Y_5,U_5,D_5),(Y_6,V_5,D_6)\ldots$ Notice that the triplets alternately include a sample of the first output color component U and of the second output color component V.

The outputting unit 206 is arranged to output the triplets of samples to logical connections, i.e. channels. In the table below it is indicated to which of the channels the samples are mapped.

| First channel | $Y_1$ | $Y_2$ | $Y_3$ | $Y_4$ | $Y_5$ | $Y_6$ | $Y_7$ | $Y_8$ | $Y_9$ |
|---|---|---|---|---|---|---|---|---|---|
| Second channel | $U_1$ | $V_1$ | $U_3$ | $V_3$ | $U_5$ | $V_5$ | $U_7$ | $V_7$ | $U_9$ |
| Third channel | $D_1$ | $D_2$ | $D_3$ | $D_4$ | $D_5$ | $D_6$ | $D_7$ | $D_8$ | $D_9$ |

Preferably, the outputting unit 206 comprises a serializer. Typically, the samples are represented with a number of bits, which ranges from 8 to 12. The data on the physical connection is preferably exchanged by means of serial transport. For that reason the bits representing the consecutive samples are put in a time sequential series.

FIG. 3 schematically shows an embodiment of the receiving unit 106 according to the invention. The receiving unit 106 is arranged to receive combined data comprising image data and related depth data and is arranged to decompose the combined data. The receiving unit 106 comprises:

a reception unit 306 for reception of the combined signal, comprising a luminance component and a chrominance component representing the image data and comprising a depth component which is based on the depth data, the combined signal having been transmitted over a number of channels;

an extraction unit 304 for extracting the luminance component and the chrominance component from the combined signal; and a converting unit 302 for converting the luminance component and the chrominance component into an image signal, representing the image data, the image signal comprising a predetermined number of input color components whereby the predetermined number of input color components is equal to the number of channels.

The reception unit 306, the extraction unit 304 and the converting unit 302 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

Preferably, the reception unit 306 comprises a de-serializer. The data on the physical connection, via which the combined signal is provided to the receiving unit 106, is preferably exchanged by means of serial transport. However, typically the data format within the context of the receiving unit 106 is such that direct access to all bits of the samples is more convenient, i.e. parallel data access.

The extraction unit 304 is arranged to extract the luminance component Y and the chrominance C component from the combined signal as received by the reception unit 306 of receiving unit 106. The chrominance component C comprises two output color components U and V. The extraction unit 306 is also arranged to extract the depth samples from the combined signal.

The converting unit 302 is arranged to compute samples of the three input color components R,G,B on basis of the samples of the luminance component Y and the two output color components U and V, as specified in the Equations 5-7:

$$R = Y*1 + U*0 + V*1.14 \quad (5)$$

$$G = Y*1 + U*-0.39 + V*-0.58 \quad (6)$$

$$B = Y*1 + U*2.03 + V*0 \quad (7)$$

It should be noted that, an alternative model of color components may be applied instead of the YUV color model, e.g. YIQ, YCbCr, PhotoYCC.

FIG. 4 schematically shows an image processing apparatus 400 comprising a multi-view display device 406, both according to the invention. The image processing apparatus 400 comprises:

a receiver 402 for receiving a video signal representing input images; an image analysis unit 404 for extracting depth related data from the input images; and a multi-view display device 406 for displaying multi-view images which are rendered by the multi-view display device on basis of the provided image data and related depth data.

The image data and related depth data are exchanged between the image analysis unit 404 and the multi-view display device 406, by means of a combined signal as described in connection with FIGS. 2 and 3. The image analysis unit 404 comprises a transmitting unit 104 as described in connection with FIG. 2. The multi-view display device 406 comprises a receiving unit 106 as described in connection with FIG. 3.

The video signal may be a broadcast signal received via an antenna or cable but may also be a signal from a storage device like a VCR (Video Cassette Recorder) or Digital Versatile Disk (DVD). The signal is provided at the input connector 410. The image processing apparatus 400 might e.g. be a TV. Alternatively the image processing apparatus 400 does not comprise the optional display device but provides the output images to an apparatus that does comprise a display device 406. Then the image processing apparatus 400 might be e.g. a set top box, a satellite-tuner, a VCR player, a DVD player or recorder. Optionally the image processing apparatus 400 comprises storage means, like a hard disk or means for storage on removable media, e.g. optical disks. The image processing apparatus 500 might also be a system being applied by a film-studio or broadcaster.

The multi-view display device 406 comprises a rendering unit 408, which is arranged to generate a sequence of multi-view images on basis of the received combined signal. The rendering unit 408 is arranged to provide (at least) two correlated streams of video images to the multi-view display device which is arranged to visualize a first series of views on basis of the first one of the correlated streams of video images and to visualize a second series of views on basis of the second one of the correlated streams of video images. If a user, i.e. viewer, observes the first series of views by his left eye and the second series of views by his right eye he notices a 3-D impression. It might be that the first one of the correlated streams of video images corresponds to the sequence of video images as received by means of the combined signal and that the second one of the correlated streams of video images is rendered by appropriate shifting on basis of the provided depth data. Preferably, both streams of video images are rendered on basis of the sequence of video images as received.

In the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed. The image analysis unit 404 is an implementation for the disclosed method of extracting depth information. The rendering unit 408 is an implementation of the method of rendering disclosed in the article.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etceteras do not indicate any ordering. These words are to be interpreted as names.

The invention claimed is:

1. A method of combined exchange of image data and related depth data, comprising:

converting an input image signal, representing the image data, comprising a predetermined number of input color components comprising a red, a green and a blue color component, (R,G,B) into an output image signal comprising a luminance component and a chrominance component;

combining the output image signal with the related depth data into a combined signal, comprising the luminance component, the chrominance component and a depth component (D) which is based on the depth data; and transmission of the combined signal over a physical connection using serial transport wherein bits representing consecutive samples being transported are put in a time sequence series, the physical connection comprising a number of channels (108-112) which is equal to the predetermined number of input color components (R,G,B) and wherein the luminance component is transmitted over a first one of the channels, the chrominance component is transmitted over a second one of the channels and the depth component is transmitted over a third one of the channels.

2. A method as claimed in claim 1, whereby the applied bandwidth for each of the number of channels is substantially mutually equal in that per unit of time substantially the same amount of information is exchanged over each of the channels.

3. A method as claimed in claim 1, whereby the chrominance component comprises a further number of output color components which are computed on basis of spatially subsampling the input image signal.

4. A transmitting unit (104) for combined exchange of image data and related depth data, the transmitting unit comprising:

converting means (202) for converting an input image signal, representing the image data, comprising a predetermined number of input color components comprising a red, a green and a blue color component, into an output image signal comprising a luminance component and a chrominance component;

combining means (204) for combining the output image signal with the related depth data into a combined signal, comprising the luminance component, the chrominance component and a depth component which is based on the depth data; and outputting means (206) for outputting the combined signal over a physical connection using serial transport wherein bits representing consecutive samples being transported are put in a time sequence series, the physical connection comprising a number of channels which is equal to the predetermined number of input color components and wherein the luminance component is transmitted over a first one of the channels, the chrominance component is transmitted over a second one of the channels and the depth component is transmitted over a third one of the channels.

5. An image processing apparatus (400) comprising the transmitting unit as claimed in claim 4.

6. A method of combined exchange of image data and related depth data, comprising:

reception of a combined signal, comprising a luminance component and a chrominance component representing the image data and comprising a depth component which is based on the depth data, the combined signal being transmitted over a transmission of the combined signal over a physical connection using serial transport wherein bits representing consecutive samples being transported are put in a time sequence series, the physical connection comprising a number of channels and wherein the luminance component is transmitted over a first one of the channels, the chrominance component is transmitted over a second one of the channels and the depth component is transmitted over a third one of the channels;

extracting the luminance component and the chrominance component from the combined signal; and converting the luminance component and the chrominance component into an image signal, representing the image data, the image signal comprising a predetermined number of input color components comprising a red, a green and a blue color component whereby the predetermined number of input color components is equal to the number of channels.

7. A receiving unit (106) for combined exchange of image data and related depth data, comprising:

reception means (306) for reception of a combined signal, comprising a luminance component and a chrominance component representing the image data and comprising a depth component which is based on the depth data, the combined signal being transmitted over transmission of the combined signal over a physical connection using serial transport wherein bits representing consecutive samples being transported are put in a time sequence series, the physical connection comprising a number of channels and wherein the luminance component is transmitted over a first one of the channels, the chrominance component is transmitted over a second one of the channels and the depth component is transmitted over a third one of the channels;

extracting means (304) for extracting the luminance component and the chrominance component from the combined signal; and converting means (302) for converting the luminance component and the chrominance component into an image signal, representing the image data, the image signal comprising a predetermined number of input color components comprising a red, a green and a blue color component whereby the predetermined number of input color components is equal to the number of channels (108-112).

8. A multi-view display device (408) comprising the receiving unit (106) as claimed in claim 7.

* * * * *